United States Patent

[11] 3,585,842

| [72] | Inventor | Lewis B. Roof<br>Bartlesville, Okla. |
|---|---|---|
| [21] | Appl. No. | 823,683 |
| [22] | Filed | May 12, 1969 |
| [45] | Patented | June 22, 1971 |
| [73] | Assignee | Phillips Petroleum Company |

[54] METHOD AND APPARATUS FOR TEMPERATURE CONTROL
2 Claims, 5 Drawing Figs.

[52] U.S. Cl. ................................................. 73/23.1, 165/105
[51] Int. Cl. ............................................ G01n 31/08, F28d 15/00
[50] Field of Search ........................................... 73/23.1; 165/104, 105

[56] References Cited
UNITED STATES PATENTS

| 2,288,341 | 6/1942 | Addink | 165/105 |
| 2,561,738 | 7/1951 | Hill | 165/105 |
| 2,616,628 | 11/1952 | Guild | 165/105X |
| 3,165,149 | 1/1965 | Rable et al. | 73/23.1 |
| 3,229,759 | 1/1966 | Grover | 165/105 |
| 3,272,258 | 9/1966 | Bourquard | 165/105X |
| 3,405,299 | 10/1968 | Hall et al. | 165/105X |
| 3,489,203 | 1/1970 | Fischoll | 165/105X |

OTHER REFERENCES
IBM Technical Bulletin Vol. 10 #10 March 1968

*Primary Examiner*—Richard C. Queisser
*Assistant Examiner*—Ellis J. Koch
*Attorney*—Young and Quigg

ABSTRACT: Apparatus and method are disclosed for maintaining the temperature of an object at a constant value by placing the object in an operating heat pipe. Also method and apparatus are disclosed for maintaining the temperature of an object in a heated chamber at a constant value by positioning a heat pipe so as to remove sufficient heat to maintain isothermal conditions in said chamber.

INVENTOR.
L.B. ROOF
BY Young & Quigg
ATTORNEYS

METHOD AND APPARATUS FOR TEMPERATURE CONTROL

This invention relates to maintaining the temperature of an object at a constant value by placing the object in an operating heat pipe. In another aspect this invention relates to maintaining the temperature of an object at a constant value by placing the object inside a heated chamber and removing sufficient heat from the heated chamber by use of a heat pipe so as to maintain isothermal conditions within said chamber.

Maintaining an object at an isothermal condition is an important concomitant of many industrial processes. Specifically, analytical instruments must be maintained at a constant temperature value in order to provide accurate analysis information, or, stated another way, the analytical instruments are adversely responsive to temperature changes. The analytical instruments that are examples of the kind adversely responsive to temperature changes are chromatographic analyzers, differential refractometers, and differential densitometers. Thus, it is desirable to operate these instruments within an isothermal environment and, additionally, it is desirable that the isothermal environment be one that is produced by a relatively simple means, preferable one without moving parts, and of simple construction.

Thus, this invention represents an advancement over the prior art in that through the practice of this invention precise isothermal conditions can be maintained around an object, preferably an analytical instrument, with a simply constructed apparatus without the necessity of moving parts.

A first embodiment of this invention comprises maintaining an object at a constant value by placing the object within an operating heat pipe. Optionally in this embodiment the heat pipe is powered so as to introduce heat into the heat absorption portion of the heat pipe and heat is removed from the heat dissipation portion of the heat pipe by conductive means and an analytical instrument, and in a preferred embodiment a chromatographic analyzer, is disposed within said chamber. Additionally, optional means are provided to communicate a response to be analyzed from the exterior of the chamber to the analytical instrument and means are provided to remove the analyzed response from the instrument to the exterior of said chamber where it can be examined. Additionally, optional means are provided to remove two analysis signals from a chromatographic analyzer, compare the two signals, and record the differences.

In an alternate embodiment of this invention, a temperature control system maintains the temperature of an object at a constant value by placing the object inside a heated chamber and removing sufficient heat from the heated chamber by the use of a heat pipe so as to maintain the chamber in an isothermal condition. Optionally, in this embodiment an analytical instrument, and in a preferred embodiment a chromatographic analyzer, is placed inside a heated chamber and maintained at isothermal conditions by disposing a heat pipe within the wall of the chamber so as to expose the heat absorption portion of the heat pipe to the interior of the chamber and the hat dissipation portion of the heat pipe to the environment of the chamber, and means are provided to communicate a response to be analyzed from the exterior of said chamber to the instrument, and means are provided to remove an analyzed response from said instrument to the exterior of said chamber. Additionally, optional means are provided to remove two analysis signals from a chromatographic analyzer, compare the two signals, and record the differences.

Accordingly, it is an object of this invention to maintain the temperature of an object at a constant value by placing the object inside an operating heat pipe. Additionally, it is an object of this invention to maintain temperature of an object at a constant value by placing the object inside a heated chamber wherein a heat pipe is utilized to remove sufficient heat from the chamber in order to maintain isothermal conditions within the chamber. Additionally, it is an object of this invention to produce more accurate analysis from an analytical instrument by operating the instrument in an isothermal environment. Furthermore, it is an object of this invention to reduce the labor and material costs through closer quality control by obtaining more accurate results from an analytical instrument. In addition, it is an object of this invention to minimize off-specification products by obtaining more accurate analysis from an analytical instrument. Other objects, advantages, and features of this invention will be readily apparent to those skilled in the art from the following description and drawing and the appended claims.

The attached figures represent only one embodiment of the invention, as other embodiments will be readily apparent to one skilled in the art. Specifically, FIG. 1 represents an elevation in partial cross section illustrating a chromatographic analyzer comprising a chromatographic column and a detector cell disposed within an operating heat pipe.

Figure 1:
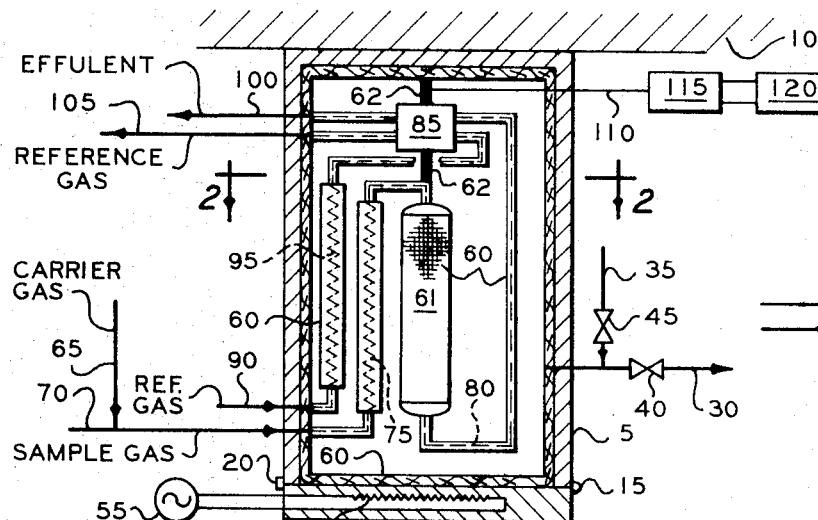

Thus, according to this invention, a heat pipe is used in order to maintain isothermal conditions around an object, and in another embodiment around an analytical instrument.

As has become recently known in the art, the heat pipe is essentially a closed, pressuretight evacuated chamber whose inside walls are, in one embodiment, lined with a capillary structure or wick that is saturated with a working fluid. When heat is added to the heat absorption portion of the heat pipe, a portion of the fluid is boiled and the vapors are subsequently condensed in the heat dissipation portion of the heat pipe, thus transferring heat from the heat absorption to the heat dissipation portion of the heat pipe.

The operation of a heat pipe combines two familiar principles of physics: vapor heat transfer and capillary action. Vapor heat transfer is responsible for transporting the heat energy from the evaporator, or heat absorption, section at one end of the pipe to the condenser, or heat dissipation, section at the other end. Variations in source temperature affect only the rate of evaporation; an increase in the temperature of the heat source causes an increase in the rate of evaporation at that point without affecting the temperature of evaporation. Condensation of the working fluid at the heat-delivery, or heat dissipation, section takes place at the temperature at which the fluid was evaporated, regardless of the nature of the heat input. Thus, theoretically, the heat pipe operates at a single temperature—the boiling-condensation temperature of the working fluid; however, in practice a very small temperature gradient exists because a small pressure gradient is generated between the boiler and condenser section and because there are some radial temperature gradients due to thermal conduction where heat is added and removed. However, for all practical purposes the heat tube can be considered to operate at an isothermal condition.

Capillary action can be utilized for returning the condensed working fluid back to the evaporator section by installation of a porous wick. When the wick is used a limitation on the operation of the heat pipe occurs when the gravitational force pulling the fluid in one direction exceeds the capillary force in the other direction. Alternatively, the heat pipe can be operated without a wick by positioning the heat absorption portion lower than the heat dissipation portion so that the condensed fluid is returned to the evaporation section by purely gravitational action.

The heat pipe derives its unique properties, therefore, from the combination of vapor heat transfer and, in one embodiment, capillary pumping.

Heat pipes have been made to operate at various temperatures spanning the range from below freezing to over 3600° F.

The working fluid can comprise water, acetone, glycerine, ammonia, cesium, sodium, potassium, lead, bismuth, fluoridated hydrocarbons, mercury, and other materials.

The pressure tight chamber forming the heat pipe can be constructed of glass, ceramic, copper, stainless steel, nickel, tungsten, molybdenum, titanium, and any material that will provide sufficient confining strength at the operating pressure of the heat pipe.

The wick, when used, can comprise any suitably porous capillary structure capable of transporting fluid from the condensation portion of the heat pipe to the boiling portion of the heat pipe and, specifically, can consist of porous metal, woven wire mesh, fiberglass, longitudinal slots in the inner surface of the chamber, woven cloth, porous ceramic, paper, and the like.

In physical size, heat pipes can exist in any size demanded by a particular application and can be designed in virtually any configuration.

Figure 2:
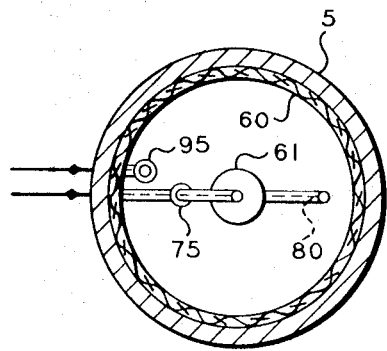
FIG. 2 represents a cross section showing the cylindrical nature of the heat pipe.

Referring now to FIGURES 1 and 2, there is illustrated one embodiment of this invention where a heat pipe is used to control the temperature of the environment of an object at isothermal conditions. In FIG. 1 there is illustrated a closed, pressuretight chamber 5 forming the outside of the heat pipe. This chamber is thermally conductively attached to a heat sink, which in this instance comprises a suitably large mass of conductively heat dissipating material 10, which also supports said chamber 5. Additional other means can be used to remove heat from the heat dissipation portion of chamber 5 by convection, conduction, or radiation phenomenon.

Chamber 5 can be constructed of any suitable material containing sufficient strength to confine the operating fluid at the operating pressure. Specifically, the materials noted earlier are satisfactory.

In the embodiment being illustrated, chamber 5 is fitted with a pressuretight bottom 25 which is hingably removable by rotating around hinge 15 and can be latched into the pressuretight position by latch 20. Thus, by the use of the pressure sealably removable bottom, access can be gained to the heat pipe in order to install and service objects, preferably analytical equipment, placed therein. After bottom 25 is sealed in place air is evacuated from the chamber via conduit 30 with valve 40 open and valve 45 in conduit 35 closed. After the chamber has been evacuated valve 40 is closed and valve 45 is opened and any suitable working fluid, such as those noted earlier, is conducted into evacuated chamber 5 via conduit 35.

The working fluid begins to vaporize at first until at the particular temperature of the fluid, the vapor pressure of the fluid is equal to the pressure of the gas within the formerly evacuated chamber, or, stated another way, the liquid will begin to vaporize when introduced into the evacuated chamber 5 and will continue to do so until the pressure of the vapors within the chamber achieves the vapor pressure of the liquid at the particular temperature, whereupon a two-phase relationship is established and the liquid and gas phase exist in equilibrium and, accordingly, the liquid is at its boiling point and the gas is at its condensation point. Thus, a sufficient quantity of working fluid must be introduced so as to achieve the vapor-liquid equilibrium discussed above or the heat pipe is inoperative.

The quantity of material that will be required can be calculated by elementary thermodynamic calculations. Additionally, in a preferred embodiment sufficient fluid to entirely wet the wick is used but lesser amounts are satisfactory. Thus, when a sufficient quantity of fluid has been introduced through conduit 35, valve 45 is shut and the heat pipe is ready to be operated. Any working fluid can be selected that functions satisfactorily for the intended use; however, the fluids noted earlier are particularly satisfactory, and in a preferred embodiment water was used.

In the illustrated embodiment a porous wick 60 was used as a capillary structure and hence the interior walls are covered with the wick. Additionally, if desired, the object in the heat pipe, together with associated conduits, etc., can be covered with the wick as shown in FIGS. 1 and 2. Any porous capillary structure can be used as noted earlier, and in a preferred embodiment woven cloth was used. The contents of the heat pipe are covered with a wick to assist in maintaining the components in an isothermal condition as the heat transfer from the working fluid into the members that it covers is superior to heat transfer from the working fluid into the members that it covers is superior to heat transfer from the gaseous working fluid itself.

Thus, in order to operate the heat pipe a means to introduce heat into the heat absorption portion of chamber 5 must be provided. In one embodiment a resistance element 50 was incorporated into chamber bottom 25 and powered by an external electrical power source 55. Thus, when resistor 50 is powered, heat is introduced into the chamber and the heat is removed from the lower portion of the chamber by boiling a portion of the working fluid residing in the lower portion of the chamber. The vapors from the boiling of this fluid are, of course, in reality at the same temperature as the vapors in the tube that are in equilibrium with the working fluid prior to operating the tube. Thus, heat will be removed from the interior of chamber 5 by condensing vapors in the region of the heat dissipation portion of the heat pipe in the vicinity of the heat sink, which in this embodiment comprises conduction mass 10. As noted, chamber 5 is conductively attached to mass 10 and mass 10 supports chamber 5, although it is fully within the scope of this invention to support chamber 5 in another manner and remove heat from the heat dissipation portion by either radial or convective means.

In this embodiment where chamber 5 is suspended from mass 10, no wick is required in order to operate the heat tube as the condensing vapors will return by gravitational action to the lower region of the heat tube where heat is being applied. It is perfectly within the scope of this invention to invert the heat tube and to force the condensed vapors to move against the flow of gravity back to the higher heat absorption portion of the heat pipe by installation of a capillary structure. In a preferred embodiment as shown in FIGS. 1 and 2, a wick 60 is used to provide for increased capillary transportation of condensed fluid and, as noted, better heat transfer to the components within the heat tube that are covered in the wick.

Pressure chamber 5 in this embodiment comprises a circular configuration as noted in FIG. 2; however, the heat pipe can be constructed of any suitable geometry beside the circular embodiment of FIG. 2.

The object that is to be retained within an isothermal environment according to this invention can comprise any object desired to be maintained in an isothermal condition. As noted, analytical instruments are often adversely responsive to temperature changes and thus must be operated within an isothermal environment to insure reliable functioning. Specifically, a chromatographic analyzer is adversely effected by temperature changes and is used in a preferred embodiment.

Briefly, analysis of a sample gas by a gas chromatograph is well known in the art and involves injecting a sample of the gas into a carrier stream. The carrier gas then conveys the sample through a chromatographic column provided with a suitable means which selectively time separates the components of the gaseous stream by retarding the movements of the components through the column. The time-separated components are then selectively eluted from the column and are conducted to a detector cell where a signal reflective of the composition of the time-separated components is generated. The analysis is then completed by comparing the voltage of this signal to the voltage of a signal reflective of the comparison of a reference gas conducted to the detector cell. These voltages are usually compared in a wheatstone bridge or similar means and the difference is recorded on a recorder.

Thus, in FIG. 1 carrier gas is introduced in conduit 65 and sample gas in conduit 70. The combined stream is then conducted into the operating heat pipe through elongated conduit 75. Conduit 75 comprises sufficient length to adjust the temperature of the gas stream to the operating temperature of the heat tube, and is covered with a wick 60 in a preferred embodiment. As noted, the fluid retained in the wick provides for increased heat transfer as opposed to merely conducting the conduit 75 through the vaporous working fluid.

The various components of the sample gas are time separated within chromatographic column 61 and are eluted via conduit 80 to detector cell 85 where a signal reflective of the composition of the time-separated components is generated. Column 61 and cell 85 are suspended by means 62 in this embodiment. Simultaneously, a reference gas is introduced via conduit 90 and via elongated conduit 95 which also comprises sufficient length to adjust the temperature of the gas to the operating temperature of the heat pipe. The reference gas is then introduced into detector cell 85 and a signal reflective of the composition of the reference gas is generated therein. The sample and carrier gases are then removed from the heat pipe by conduits 100 and 105, respectively. The voltage from the signal reflective of the composition of the time-separated components in the sample gas and the voltage in the signal reflective of the composition of the reference gas are removed from the heat pipe via means 110 and are compared, and in this embodiment are impressed across the terminals of the wheatstone bridge wherein the differences between the voltage values are recorded in recorder 120.

Thus, according to this embodiment of the invention a chromatographic analyzer has been placed within an operating heat pipe so as to maintain isothermal conditions and generate analysis values which are highly accurate.

Figure 3:
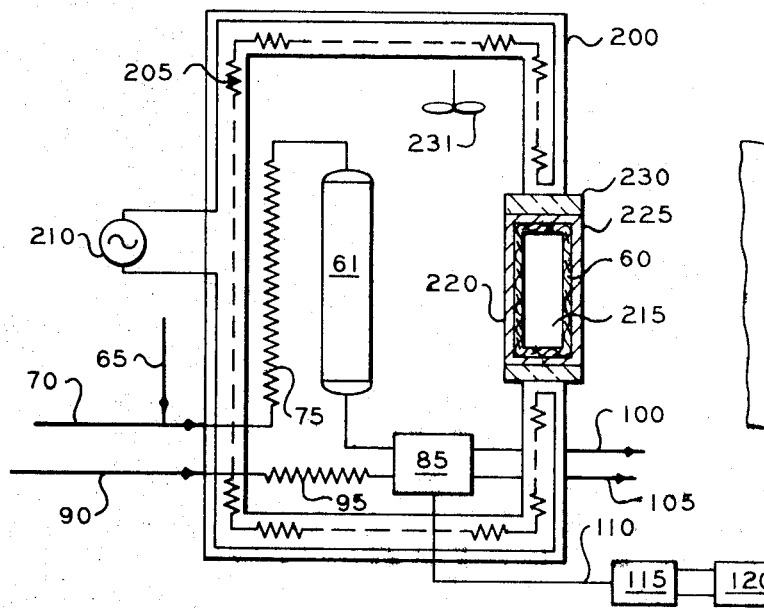
FIG. 3 represents an elevation in partial cross section showing a chromatographic column and detector cell disposed within a heated chamber maintained at isothermal conditions by removal of heat through a heat pipe.
Figure 4:
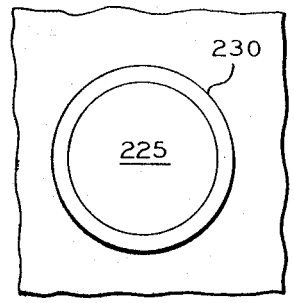
FIG. 4 illustrates an elevation view of the chamber wall showing the heat pipe in its insulated configuration.
Figure 5:
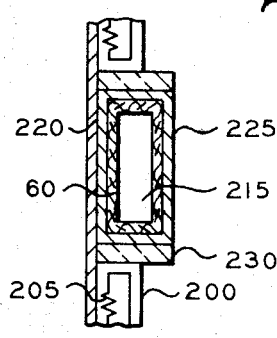
FIG. 5 represents an alternate embodiment of the invention with the heat pipe disposed within the chamber wall.

In FIGS. 3, 4, and 5, there is represented the embodiment of the invention wherein the heated chamber is controlled at isothermal conditions by use of a heat pipe disposed within a wall of the chamber. As noted earlier, the heat absorption portion of the heat pipe remains at precisely the boiling temperature of the working fluid regardless of the quantity of heat absorbed; therefore, the temperature inside the chamber will remain at the temperature of the working fluid since the heat pipe will remove any quantity of heat from the chamber above that necessary to keep the temperature of the chamber at the boiling temperature of the working fluid.

Stated another way, since heat will tend to flow from hot to cold, if the temperature of the chamber is below the temperature of the heat pipe operation (working fluid boiling point) then no heat will be transferred from the chamber. As the chamber temperature rises and subsequently exceeds the heat pipe operating temperature, the heat pipe will be "driven" and will transfer heat out of the chamber until the chamber temperature falls to that of the heat pipe operation whereupon no further heat transfer will take place.

Thus, there is illustrated a chamber 200 heated by a suitable heating means which in one embodiment comprises resistive heating means 205 connected to external electrical power supply 210. Heating means 205 must heat the interior temperature of the chamber to a value higher than the environment temperature at which the chamber is place. Thus, in this embodiment of the invention the heated chamber 200 is controlled, or thermostated, at isothermal conditions by use of heat tube 215.

Heat tube 215 is disposed so that the heat absorption portion of the heat tube is capable of removing heat from the interior of the chamber 200 and the heat dissipation portion capable of transferring heat to the environment of the chamber. In this configuration the heat tube is designed to thermostat heated chamber 200 by transferring heat by radial and convective heat transfer; however, if natural convection is insufficient, means 231 to circulate gaseous matter within the chamber can be provided.

If it is desired to thermostat chamber 200 by transferring heat through primarily radial means, then heat absorption portion 220 could be constructed in a hemispherical configuration, or other geometry, in order to increase radial heat transfer. In another embodiment if it is desired to remove heat from the chamber by primarily conductive means, then heat pipe 215 can be positioned within the wall of chamber 200 as shown in FIG. 5. In this embodiment the heat absorption portion 220 is conductively disposed against a nonheated portion of said chamber wall so as to withdraw heat from the chamber through said wall and the heat dissipation portion 225 is disposed so as to transfer heat to the environment by radial and convective heat transfer. Obviously, other heat transfer configurations are possible and are fully within the scope of this invention.

In both this embodiment and the embodiment in FIG. 3, heat pipe 215 is thermally insulated from chamber 200 by thermal insulating means 230. Insulating means 230 is provided in order to prevent heat from being transferred into the heat pipe between the heat absorption and heat dissipation portions thereof so as to, in some instances, render the pipe partially inoperable.

Although the heat pipe as noted above can comprise any geometry, in this embodiment a cylindrical heat pipe of substantially greater diameter that height is utilized as illustrated in FIG. 4 which is a plan view of the wall of chamber 200 wherein the heat pipe is disposed.

In the embodiment illustrated in FIG. 3, heat pipe 215 is adapted to transport condensate by capillary means; therefore, it is equipped with a wick 60 which can comprise any of the aforenoted materials. As noted, the wick can be eliminated if the invention is caused to operate so that condensate is transported to the boiling region of the heat tube by gravity.

In this embodiment of the invention the same chromatographic analyzer, bridge, and recorder as noted in FIGS. 1 and 2 are used, except in this embodiment the components are not covered with a wick as they are in an alternate embodiment in FIG. 1.

The above-noted construction materials, wick materials, and working fluids utilized in the embodiments illustrated in FIGS. 3, 4, and 5 can be the same as noted in FIG. 1 and 2.

Thus, according to this embodiment of the invention a chromatographic analyzer has been placed within a heated chamber and highly accurate analysis values obtained by using a heat pipe to remove sufficient heat to maintain isothermal conditions in the chamber.

Thus, this invention is broadly applicable to maintaining the temperature of an object at a constant value by utilizing a heat pipe to provide an isothermal environment for the object.

As noted, the drawing is merely diagrammatic and is not intended to fully show all component parts of the apparatus which one skilled in the art would routinely design for the operation thereof. Indeed, the showing of an element or piece of equipment does not mean that all such or similar pieces of equipment which may or can be designed by one skilled in the art in possession of this disclosure cannot be utilized as substitution therefor. Likewise, the omission of an element which one skilled in the art may include in an actual unit does not mean that such a piece of equipment is intended to be omitted simply because it does not appear in the drawing. Specifically, one skilled in the art can position the heat tube so as to transport condensed vapors against, or with, the pull of gravity, can comprise various wicks, can operate with various fluids, and place a variety of objects including a variety of analytical instruments within the isothermal environment of this invention. In addition, many geometries of the heat pipe and the heated chamber are possible.

I claim:

1. Apparatus for maintaining an analytical instrument at a constant temperature comprising:

a housing having a heating element in a wall thereof to maintain the interior of the housing at an elevated temperature;

an analytical instrument positioned within said housing;

a heat pipe disposed in a wall of said housing, said heat pipe comprising a hollow cylindrical metal element of substantially greater diameter than height, said cylindrical element being positioned so that the first end thereof is in thermal contact with the interior of said housing and the second end thereof is in thermal contact with a region exterior of said housing, heat-insulating means disposed between the sidewall of said cylindrical element and the wall of said housing, a wick disposed within said cylindrical element and extending between the first and second ends thereof, and a fluid disposed within said cylindrical element, said fluid being vaporized by contact with said first end of said element and condensed by contact with said second end; and a fan disposed within said housing to circulate air in said housing past said first end of said cylindrical element.

2. The apparatus of claim 1 wherein said fluid is water.